United States Patent Office 3,268,405
Patented August 23, 1966

3,268,405
4-AMINOMETHYL - CYCLOHEXANE - 1 - CARBOXYLIC ACID FOR INHIBITING THE ACTIVATION OF PLASMIN
Fujio Nagasawa, Shosuke Okamoto, Eiichi Takagi, Mikio Yokoi, and Mitsuo Mangyo, all of Tokyo, Japan, assignors to Mitsubishi Chemical Industries Limited, Tokyo, Japan, a corporation of Japan
No Drawing. Filed May 8, 1961, Ser. No. 108,245
8 Claims. (Cl. 167—65)

This invention relates to a new useful drug composition for inhibiting the activation of plasmin and/or activity of plasmin in vitro and in vivo; more particularly, this invention relates to the new composition in which 4-(aminomethyl)-cyclohexane-1-carboxylic acid is used as an active ingredient having a potent inhibitory action on the plasmin system and also an excellent therapeutic effect on disorders associated with and/or caused by the activated plasmin in vivo, without any accompanying noticeable toxicity when applied.

In U.S.P. 2,939,817, British Patent 770,693 and Canadian Patent 593,482, we proposed that ε-amino-n-caproic acid (hereinafter called EACA) or its molecular compounds with calcium halide inhibit the activation of plasmin or suppress the high activity of plasmin at a low concentration of about $2 \times 10^{-6}$ mol. and that they are satisfactory from the viewpoint of non-toxicity, and that EACA is useful in treating diseases associated with and/or caused by plasmin activation in vivo.

The inventors of the mentioned invention and their medical associates have made various investigations either experimentally or clinically as to the pathologic significance of plasmin system in the living organism, and have found out many grounds that plasmin in the blood and/or in the tissues is activated (1) in the case of acute exudative skin diseases suspected to be allergic such as acute eczema, dermatitis and urticaria, and (2) in the case of bleeding such as gum-bleeding, spot-like hypodermatic bleeding appearing in leukemia or aplastic anaemia, uterus bleeding caused by the dysfunction of uterus and some other types of hemorrhage. Such phenomenon as the activation of plasmin in the blood was naturally found in the case of introducing streptokinase preparation and human serum to animals. Furthermore, when EACA was applied to patients suffering from the above-mentioned diseases, in whom plasmin activity is distinctly high in the circulatory blood, activation and/or activity of plasmin in the blood were obviously suppressed and the clinical signs such as bleeding or exudation were remarkably improved. The utility of the clinical application of EACA to patients of the above mentioned kinds was repeatedly confirmed by conducting examinations on a number of patients and also by appropriate controls proving the effectiveness of the clinical application of EACA (S. Okamoto, The Keio Journal of Medicine, vol. 8, No. 4, p. 211 (1959); K. Yokoyama and H. Hatano, ibid p. 303, K. Nakajima and S. Sato, ibid p. 267, I. Mikata and T. Igarashi, ibid p. 319, I. Mikata and T. Igarashi, ibid p. 279). Besides, the results mentioned therein indicate that a non-toxic substance, having a potent inhibitory action on the plasmin system in vitro tests as well as in animal experiments, may also exert an inhibitory action on the plasmin system of patients when administered, and that the administration of such an active ingredient may improve such clinical signs as exudation or bleeding in patients that are associated with and/or caused by plasmin activation.

This tempted the inventors of the present invention to further investigation looking for a more potent synthetic antiplasminic substance than EACA.

As a result of the investigation conducted either chemically or physiologically, the inventors have found a chemical substance which has a more potent inhibitory action on plasmin activation and/or activity of plasmin than EACA, and which is satisfactory from the viewpoint of non-toxicity and of pharmaceutical technique.

One object of the present invention is to provide a drug composition for inhibiting the activation of plasmin and/or suppressing the high activity of plasmin in vitro and in vivo, in which 4-(aminomethyl)-cyclohexane-1-carboxylic acid (hereinafter called AMCHA) is used as an active ingredient. Another object is to provide a method for inhibiting the activation of plasmin and/or suppressing the high activity of plasmin in vitro and in vivo, especially in patients by application of AMCHA as an active ingredient.

According to the present invention, AMCHA, the active ingredient, may be admixed with some kinds of carriers or diluents which are generally used in pharmaceutical technique. The compositions may take the form of tablets, powders, capsules, or other dosage forms which are particularly useful for oral ingestion; liquid diluents are employed in sterile condition for parenteral uses such as injection. Furthermore, the active ingredient can be used together with other active ingredient used for pharmaceuticals. The compositions may take the form of active material, namely, active ingredients thereof, admixed with solid diluents and/or tableting adjuvants such as cornstarch, lactose, talc, stearic acid, magnesium stearate, gums and/or the like. Any tableting materials used in pharmaceutical practice may be employed if not incompatible with said active ingredients. The material may be made into tablets with or without adjuvants. Alternatively the active ingredient with its adjuvant material may be placed in the usual capsule or resorbable material such as the usual gelation capsule and administered in that form. In another embodiment, the composition may be put up in powder packets, or may be prepared in the form of suspension in a material in which the active ingredient is not soluble. Or the active ingredient may be employed as ointment by admixing any ointment used in pharmaceutical practice, for example, oil-in-water type or water-in-oil type cream.

AMCHA having a following general formula

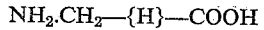

$$NH_2.CH_2—\{H\}—COOH$$

is a colorless powder having a melting point of 237–238° C. (decomposition) and being soluble in water. The solubility of AMCHA to water at 15° C. is about 25% by weight.

AMCHA is prepared by a catalytic reduction of p-aminomethyl benzoic acid or p-cyano benzoic acid in the presence of platinum oxide. AMCHA is also prepared by the reduction of 4-aminomethyl benzoic acid hydrochloride with metalic sodium in amylalcohol.

In order to examine the action of the active ingredients, AMCHA, the fibrinolytic system which contains spontaneously activated plasmin obtained from horse serum or human serum was used and the measurement of antiplasminic power was made by admixing the above-mentioned plasmin fraction with fibrinogen separated from rabbit plasma, adding to the mixture a certain quantity of substances which had been diluted, forming fibrin cloths by adding thrombin to the above mixture, and then by measuring the time required for the complete dissolution of the fibrin clots incubated at 38° C., and comparing the said time with that of the dissolution of control fibrin clots to which the substance to be measured had not been added. Thus, the power of inhibiting the activity of plasmin per se was demonstrated at a very low concentration of AMCHA, i.e., at 10 times dilution of the final effective concentration of EACA.

Another examination of the action of AMCHA on the activation process of the plasmin system in vitro was conducted by the streptokinase-activation test of serum. 0.1 ml. of fresh human serum, a 0.4 ml. of 1/20 mol. phosphate buffer saline solution and a 0.1 ml. saline solution containing 100 units of streptokinase were mixed together in a small test tube which placed in the ice water bath. After five minutes, 0.05 ml. of a saline solution containing 5 units of thrombin and 0.3 ml. of a 0.33% bovine fibrinogen solution were added to the test tube. Then the mixture was incubated at 25° C. and the time required for the complete lysis of the formed clots was measured. The results thus obtained presented the control value. Next, the inhibitory action of AMCHA was observed by dissolving it in the above-mentioned buffer solution; and the relations between the retardation of the lysis time and the concentration of AMCHA were inquired into and compared with EACA. The results are indicated in the following Table I.

TABLE I

Lysis time required for the complete dissolution of fibrin clots in the streptokinase-activation test of plasmin with various concentrations of AMCHA or EACA (1) Human serum (standard serum sample)

| Active Ingredients | Final Concentration (g./ml.)* | | | | | | | | | |
|---|---|---|---|---|---|---|---|---|---|---|
| | $10^{-\infty}$ (Control) | $10^{-11}$ | $10^{-10}$ | $10^{-9}$ | $10^{-8}$ | $6 \times 10^{-8}$ | $3 \times 10^{-7}$ | $1.6 \times 10^{-6}$ | $8 \times 10^{-6}$ | $4 \times 10^{-5}$ |
| | Lysis Time, seconds | | | | | | | | | |
| AMCHA | 652 | 600 | 641 | 728 | 955 | 1,230 | 1,350 | 2,205 | >3,600 | >3,600 |
| EACA | 660 | | | | | 660 | 890 | 810 | 1,642 | >3,600 |

*Final concentration of active ingredients in the reaction mixture (g./ml.).

The results shown in Table I indicate (1) that the lowest concentration of AMCHA in the reaction mixture required for causing a distinct retardation of the lysis time of the fibrin clots was $10^{-9}$ g./ml., namely ca. $8 \times 10^{-9}$ mol., while that of EACA was $3 \times 10^{-7}$ g./ml. and (2) that the concentration of AMCHA required for doubling the control lysis time was about $3 \times 10^{-7}$ g./ml., namely ca. $2 \times 10^{-6}$ mol., while that of EACA was about $8 \times 10^{-6}$ g./ml.

The above mentioned results also indicate that, when examined in vitro, the inhibitory action of AMCHA on the streptokinase-activation-process of the plasmin system of human serum is evidently very potent, that is, more than ten times of the action of EACA.

As to the action of AMCHA on the plasmin system in vivo, the following experiments were made. In the experiments shown in Table II, 250 mg., 100 mg. and 25 mg. of AMCHA or EACA were respectively administered by intravenous injection to rabbits.

Blood samples were then drawn by puncture at the times mentioned in Table II and the actions of AMCHA or EACA were measured by the streptokinase-activation plasmin test.

TABLE II

Lysis time required for the complete dissolution of the fibrin clot in the streptokinase activation test on plasmin of the circulatory blood

| Active Ingredients | | Time Course | | | |
|---|---|---|---|---|---|
| | | Control | After 1-2 hrs. | After 3-4 hrs. | After 5-6 hrs. |
| Name | Amount, mg. | Lysis Time, seconds | | | |
| AMCHA | 250 | 1,320 | >2,400 | >2,400 | >2,400 |
| EACA | 250 | 1,200 | >2,400 | >2,400 | >2,400 |
| AMCHA | 100 | 1,080 | >3,600 | | 1,926 |
| EACA | 100 | 900 | 1,950 | | 1,884 |
| AMCHA | 25 | 1,986 | >3,600 | >3,600 | 2,592 |
| EACA | 25 | 1,992 | 2,586 | 2,424 | 2,166 |

The results in Table II are summarized as follows:

(1) The intravenous administration of 250 mg. of AMCHA or EACA dissolved in a saline solution, produced a very marked retardation of lysis time from one hour to six hours after the injection of said active ingredients, indicating that AMCHA and EACA exerted strong inhibitory action of the same order on the plasmin system in vivo when such large amounts as 250 mg. were administered to rabbits.

(2) The action of AMCHA, however, was different from that of EACA when 100 mg. and 25 mg. of these active ingredients were administered by intravenous injection to rabbits. The intravenous administration of 25 mg. or 100 mg. of AMCHA produced a marked retardation of lysis time, while that of EACA was obviously weaker than AMCHA, indicating that AMCHA exerted a stronger action than EACA on the plasmin system in vivo when such an amount as 25 mg. was administered to rabbits.

The action of AMCHA in vivo was compared with that of EACA by administering such a small amount of the active ingredients as 5 mg. by intravenous injection to the rabbit, and the results obtained from five rabbits are shown in Table III.

TABLE III

| Animal No. | Active Ingredients | | Time Course | | | | | Inhibitory Effect |
|---|---|---|---|---|---|---|---|---|
| | Name | Amount, mg. | Control | 1/2-1 hr. | 1/2-2 hrs. | 4 hrs. | 6 hrs. | |
| | | | Lysis Time, seconds | | | | | |
| 1 | AMCHA | 5 | 456 | 750 | 588 | 510 | 510 | Exists. |
| 2 | AMCHA | 5 | 690 | 1,230 | 1,080 | 990 | 840 | Do. |
| 3 | AMCHA | 5 | 1,050 | 1,968 | 1,350 | 1,320 | 1,170 | Do. |
| 4 | EACA | 5 | 420 | 450 | 450 | 450 | 438 | None. |
| 5 | EACA | 5 | 480 | 480 | 510 | 510 | 450 | Do. |

In three rabbits to which 5 mg. of AMCHA was administered intravenously, the retardation of lysis time was obviously confirmed in each blood sample which was taken from ½ hour to six hours after the administration of AMCHA; in two rabbits to which 5 mg. of EACA was administered intravenously, any retardation of lysis time was hardly confirmed, indicating the very potent antiplasminic action of AMCHA in vivo. That is, comparing the weight of rabbits with that of adult patients and making a calculation from the results shown in Tables II and III, it is suggested that the administration of 150 mg. of AMCHA to patients can result in a distinct suppression of fibrinolysis of the blood and the administration of 750 mg. of AMCHA can arrest the fibrinolysis of the blood substantially.

Another experiment was made by giving subcutaneously 10 cc. of a 10% aqueous solution of AMCHA to a rabbit weighing 2.4 kg. (420 mg. of active ingredients per 1 kg. of weight of the rabbit). The concentration of AMCHA in the blood serum after 30 minutes showed its maximum value, namely 50–60 mg./dl. serum. It decreased gradually with the lapse of time; that is, it decreased to half of the maximum after 3 hours, and to one tenth after 6 hours. The excretion of the active ingredient of AMCHA in urine was perceived at the rate of 80% after 24 hours.

Furthermore, an experiment was carried out by giving per os 1.0 g. of AMCHA in powder to a rabbit weighting 2.4 kg. AMCHA was recognized in the blood serum 30 minutes after administration; the concentration of AMCHA in the serum showed 20–30 mg./dl. of serum from 30 minutes to 2 hours, decreased gradually to about 3 mg./dl. after 5–6 hours and remained a little after 24 hours. In these cases of administering AMCHA per os, the excretion of AMCHA in urine was perceived in its original form at the rate of about 60% within two days and 10% in the following two days.

Thus, the results on the absorption and excretion of AMCHA administered by parenteral or per os administration indicate that the excretion of AMCHA was fairly rapid, whereby no trouble caused by accumulation of AMCHA in the living body need to be considered.

The results of the administration of AMCHA per os indicate that the absorption velocity was very rapid and that high concentration of AMCHA appeared in the blood soon after administration, proving the advantage of the per os administration of AMCHA to patients.

On the other hand, toxicity examination of AMCHA was carried out, and it was made clear that AMCHA of the present invention was not toxic. In all five cases of injecting intravenously a 5% and 10% aqueous solution of AMCHA at the rate of 1 gr. of AMCHA per 1 kg. of the weight of a mouse, no toxicity was noticed and all mice were living. And in the case of injecting intravenously a 5% aqueous solution of AMCHA at the rate of 40 mg. of AMCHA for 1 kg. of the weight of a rabbit continuously for twelve days, once a day, the rabbits were sacrificed after the lapse of nine days, and the abnormality of organs was examined histo-pathologically. Microscopic observation of the preparations of the cerebrum, cerebellum, hypophysis, heart, lung, liver, pancreas, spleen, kidney, adrenal gland, testicle, ovary, uterus and mesenteric lymphatic glands, proved that little or no trouble was produced by the repeated administration of AMCHA.

The above results suggest that, in the case of the human body, it is safe to give 50–60 gr. of AMCHA per dose, and therefore, as far as dosage is concerned, there is no trouble at all, and that such dose as 50–60 gr. of AMCHA is far larger than 150–750 mg. of AMCHA which is effective in suppressing or arresting the activation of the plasmin system in the blood when applied.

The following animal experiments were designed for examining the action of AMCHA to those disorders of living organism which were experimentally produced by the activation of plasmin in blood or in locus.

(1) The action of AMCHA upon the bleeding tendency of dog produced with the experimental activation of plasmin in blood.

A. 50 cc. of human serum, which underwent the Castelani's absorption with dog red blood cells, was administered intravenously to the dog, with the expectation that the sensibility of the dog blood to streptokinase would increase to such an extent as 1,000 times. (Originally dog blood has no or slight response to streptokinase.)

B. On the other hand, skin of the dog was incised 10 cm. long and the wound surface was opened. A filter paper of a certain size and a certain weight was closely placed on the skin surface. After 30 seconds it was taken and the amount of the dipped blood was calculated weighing the filter paper with blood. Thus the amount of bleeding was recorded in each 5 minutes.

C. Then, saline solution containing 10,000 u.–30,000 u. of streptokinase was administered intravenously to the dog, resulting the strong activation of plasmin in blood.

D. Accompanied with the mentioned activation of plasmin in blood, very marked increase of bleeding was observed to such an extent as several to more than ten times, showing the experimental representation of the "severe bleeding" with action of plasmin (which can happen in patients under surgical operation or delivery. ref. to S. Okamoto. The Keio Journal of Medicine, vol. 8, No. 4, p. 211 (1959).)

E. The intravenous administration of AMCHA of 100 mg.–250 mg. to dogs in those experiments was found to be effective in suppressing the activity of plasmin in blood. At the same time, the increased bleeding tendency observed on the incised wound began to decrease and soon after turned to be nearly normal.

The evidence obtained from here mentioned experiments indicated that the application of AMCHA to those disorders (wherein plasmin activity in blood was very high and bleeding tendency was also obviously increased) can result therapeutic effects.

(2) Action of AMCHA on the permeability-increasing of rabbit skin produced with the activation of plasmin. A solution of trypan blue was first intravenously administered to rabbits. Soon after reaction mixture, made of human plasminogen, streptokinase and fibrinogen, was subcutaneously injected to the shaved skin of rabbits and the diffusion of dye from blood to tissue caused by the injection of the reaction mixture was observed and recorded by color photograph. The appropriate controls were also taken.

Results obtained indicated that the injection of the mentioned reaction mixture resulted in the most marked permeability increasing of the dye. When 1–10 mg. of AMCHA was added to the reactor mixture (made of plasminogen, streptokinase and fibrinogen) prior to the subcutaneous injection, the permeability-increasing effect of the mentioned reaction mixture was obviously inhibited, indicating the marked suppressing effect of AMCHA on the permeability-increasing which could be produced by the plasmin system.

The evidence obtained from the mentioned experiments indicate that the application of AMCHA to those disorders (where local permeability is increased and the plasmin system in locus is activated) can result therapeutic effects.

Clinical results show the indisputable value of the composition of the present invention, which contains synthetic antiplasminic substances, i.e. AMCHA, as an example of substances for combatting the action of the pathologic proteolytic enzyme, i.e. plasmin.

The composition of active ingredients of the present invention are used generally by following the application method. In case the active ingredients are used as injection, a sterile parenteral solution, containing 0.1–25%, more preferably 2–20% concentration of active ingredients is suitable for subcutaneous, intramuscular and intravenous injection. For subcutaneous injection, a 2–5 cc. of the 5% solution is used each time. For intramuscular injection a 2–5 cc. of a 1–10% solution, preferably a 5% solution, is used, and, for intravenous injection, a 2–20% solution, preferably 5 cc. of a 5% solution, or 2–3 cc. of a 10% solution is used. The solution of any intermediate concentration is also good. The use of 1–5 gm. per day of the active ingredients is orally administered, 0.1–2 gm., preferably 0.5–1 gm. will be given at one time. When tablets, powders, capsules or other dosage forms are used, a significant amount of solid material which is pharmaceutically adopted as carrier will be admixed with the active ingredients, substantially more than 0.01% by weight. The active ingredients can be applied topically as ointment against skin diseases, then a satisfactory result will be obtained. In this case, 0.1–10%, preferably 2–5%, of the active ingredients in the ointment is used. As ointment base, emulsions-ointment generally used pharmaceutically, more especially, oil-in-water types and water-in-oil type emulsion ointments can be used. A better result can be obtained by the concurrent use, as topical application and intravenous injection, of the active ingredients than by the sole use of topical application.

For inhibiting or suppressing the bleeding on incised wounds or injuries, a sterile parenteral solution with 0.1–20%, preferably a 2–5%, concentration of the active ingredient can be also used topically in continuous or discontinuous irrigation and/or washing.

The use of 0.01–10.0 g. per day of AMCHA will be effective against many kinds of diseases. The use of more per day, or the use of every day consecutively will give no toxicity.

Among many examples which show the anti-plasminic effect of AMCHA in the living organism and the utility thereof, a certain number are described hereunder. It must be noted, however, that the effect of the compositions of the present invention is not limited to the above description, as it may well be that said effect may be obtained in the case of other diseases than those specifically named herein.

What we claim is:
1. A method for inhibiting the activation and suppressing the activity of plasmin in vivo, comprising introducing into the living body 4-(aminomethyl)-cyclohexane-1-carboxylic acid and a pharmaceutical carrier.
2. A method as claimed in claim 1 which comprises administering 0.01 to 99.99% by weight of 4-(aminomethyl)-cyclohexane-1 - carboxylic acid, the remainder being a pharmaceutical carrier.
3. A method as claimed in claim 1 which comprises administering about 1% to 50% by weight of 4-(aminomethyl)-cyclohexane-1 - carboxylic acid, the remainder being a pharmaceutical carrier.
4. A method as claimed in claim 1, in which the concentration of 4-(aminomethyl)-cyclohexane-1-carboxylic acid in sterile parenteral water is 1.0 to 20 percent by weight.
5. A method as claimed in claim 1 in which the amount of 4-(aminomethyl)-cyclohexane-1-carboxylic acid is 0.01 to 10.0 g. per dose.
6. A method as claimed in claim 1 in which the amount of 4-(aminomethyl)-cyclohexane-1-carboxylic acid is 0.5 to 1.5 g. per dose.
7. A method as claimed in claim 1 in which said introduction is topical.
8. A method as claimed in claim 1 in which said introduction is intravenous.

References Cited by the Examiner

Chemical Abstracts, volume 52, page 19,983g of Japanese Patent 27, January 10, 1958, Tagaki et al.

Chemical Abstracts Formula Index, volume 55, January–June 1961, p. 129F, $C_8H_{15}NO_2$.

Chemical Abstracts 55: 3004f 1961 (abstract of Ciocca B. et al., Parfum. cosmet. savon 3: 363–8 1960).

JULIAN S. LEVITT, *Primary Examiner.*

FRANK CACCIAPAGLIA, JR., MORRIS O. WOLK,
*Examiners.*

EUGENE FRANK, VERA C. CLARKE,
*Assistant Examiners.*